(12) United States Patent
Wu et al.

(10) Patent No.: US 8,238,085 B2
(45) Date of Patent: Aug. 7, 2012

(54) DETACHABLE PORTABLE COMPUTING DEVICE

(75) Inventors: Wei Wu, Shenzhen (CN); Xin Yang, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 357 days.

(21) Appl. No.: 12/699,825

(22) Filed: Feb. 3, 2010

(65) Prior Publication Data

US 2010/0271771 A1    Oct. 28, 2010

(30) Foreign Application Priority Data

Apr. 23, 2009    (CN) .......................... 2009 1 0301773

(51) Int. Cl.
*G06F 1/16* (2006.01)

(52) U.S. Cl. ........... 361/679.17; 361/679.58; 312/223.1; 312/223.2

(58) Field of Classification Search ............. 361/679.17, 361/679.58
See application file for complete search history.

(56) References Cited

U.S. PATENT DOCUMENTS

| | | | | |
|---|---|---|---|---|
| 4,903,221 A | * | 2/1990 | Krenz | 361/679.12 |
| 4,976,559 A | * | 12/1990 | Inagaki | 400/691 |
| 5,677,827 A | * | 10/1997 | Yoshioka et al. | 361/679.58 |
| 5,966,284 A | * | 10/1999 | Youn et al. | 361/679.17 |
| 6,672,796 B2 | * | 1/2004 | Chiang et al. | 403/327 |
| 6,700,773 B1 | * | 3/2004 | Adriaansen et al. | 361/679.08 |
| 6,781,823 B1 | * | 8/2004 | Nyack | 361/679.29 |
| 6,980,420 B2 | * | 12/2005 | Maskatia et al. | 361/679.57 |
| 7,509,142 B2 | * | 3/2009 | Ditzik | 455/557 |
| 7,545,631 B2 | * | 6/2009 | Chen | 361/679.55 |
| 7,599,178 B2 | * | 10/2009 | Huang et al. | 361/679.43 |
| 2003/0021082 A1 | * | 1/2003 | Lu et al. | 361/683 |
| 2003/0142472 A1 | * | 7/2003 | Park | 361/683 |
| 2004/0160737 A1 | * | 8/2004 | Kuo | 361/683 |
| 2008/0144262 A1 | * | 6/2008 | Lai | 361/680 |

* cited by examiner

*Primary Examiner* — Anthony Q Edwards
(74) *Attorney, Agent, or Firm* — Altis Law Group, Inc.

(57) ABSTRACT

A detachable portable computing device is provided. The computing device comprises a display device and a main body. The main body comprises a base and a detachable member. The base is rotatably connected to the display device. The detachable member is detachably connected to the base. The computing device also includes a latching mechanism configured for detachably connecting the detachable member to the base. The latching mechanism comprises a first locking member, a second locking member, and an actuating mechanism. The first locking member is securely connected to one of the base and the detachable member. The second locking member is movably connected to the other one of the base and the detachable member. The second locking member is slidable between a first position and a second position where the second locking member engages and disengages the first locking member.

11 Claims, 8 Drawing Sheets

DETACHABLE PORTABLE COMPUTING DEVICE

BACKGROUND

1. Technical Field

The present disclosure relates to portable computing devices and, more particularly, to a detachable portable computer.

2. Description of Related Art

A portable computing device such as a laptop computer typically includes a main body, and a display unit that pivots upwardly from the main body to provide a user with a viewing environment. One problem that often burdens the users of portable computers is eye fatigue resulting from prolonged viewing of the display unit at a constant position.

Therefore, it is desirable for the display unit to be detachable from the main body so that the user may position the display unit in a location that is less conducive to eye fatigue.

BRIEF DESCRIPTION OF THE DRAWINGS

The components in the drawings are not necessarily drawn to scale, the emphasis instead being placed upon clearly illustrating the principles of the detachable portable computing device. Moreover, in the drawings, like reference numerals designate corresponding parts throughout the several views.

DETAILED DESCRIPTION

Figure 1:
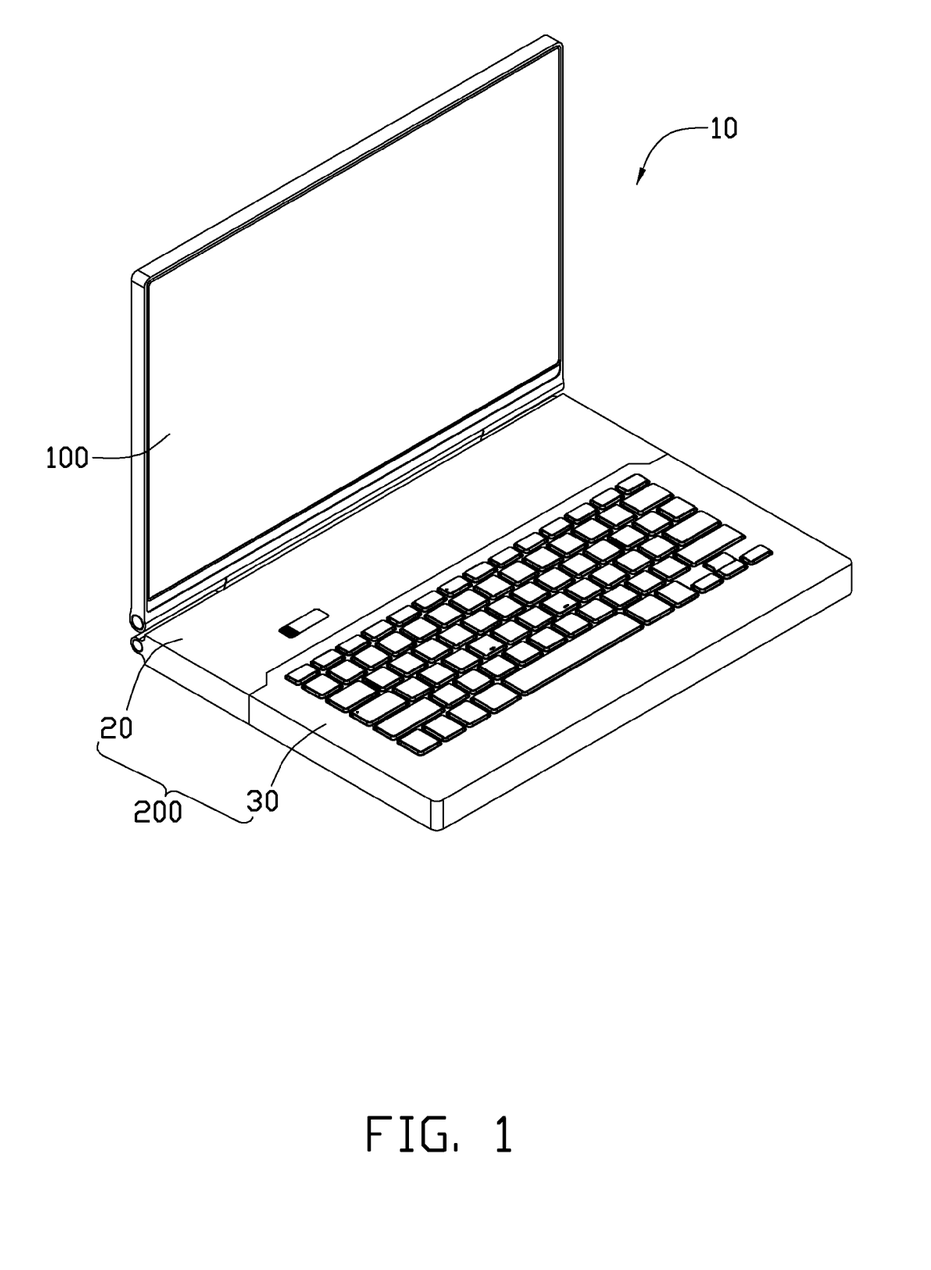
FIG. 1 is an isometric view of a detachable portable computing device in accordance with an exemplary embodiment.

Referring to FIG. 1, a portable computing device 10 is disclosed. In an exemplary embodiment, the computing device 10 is a laptop computer. The computing device 10 includes a display device 100 and a main body 200. The main body 200 includes a base 20 rotatably connected to the display device 100 and a detachable member 30 connected to the base 20.

In the exemplary embodiment, the base 20 is designed in such a way that the display device 100 can be supported on a surface by the base 20 when an angle between the display device 100 and the base 20 stays at a predetermined range. The display device 100 can thus be placed at a suitable position providing a suitable view distance for users.

Although not shown, the base 20 and the detachable member 30 each includes at least one connector, so an electrical connection between the base 20 and the detachable member 30 can be maintained. What is disclosed in U.S. Pat. No. 6,512,670 may be modified to develop an electrical connection. The base 20 and the detachable member 30 may also include suitable interface ports for connecting peripheral devices. For example, the base 20 and the detachable member 30 may include power ports, so external electrical power may be supplied to the display device 100 and the detachable member 30 after the base 20 and the detachable member 30 are separated from each other.

Figure 2:
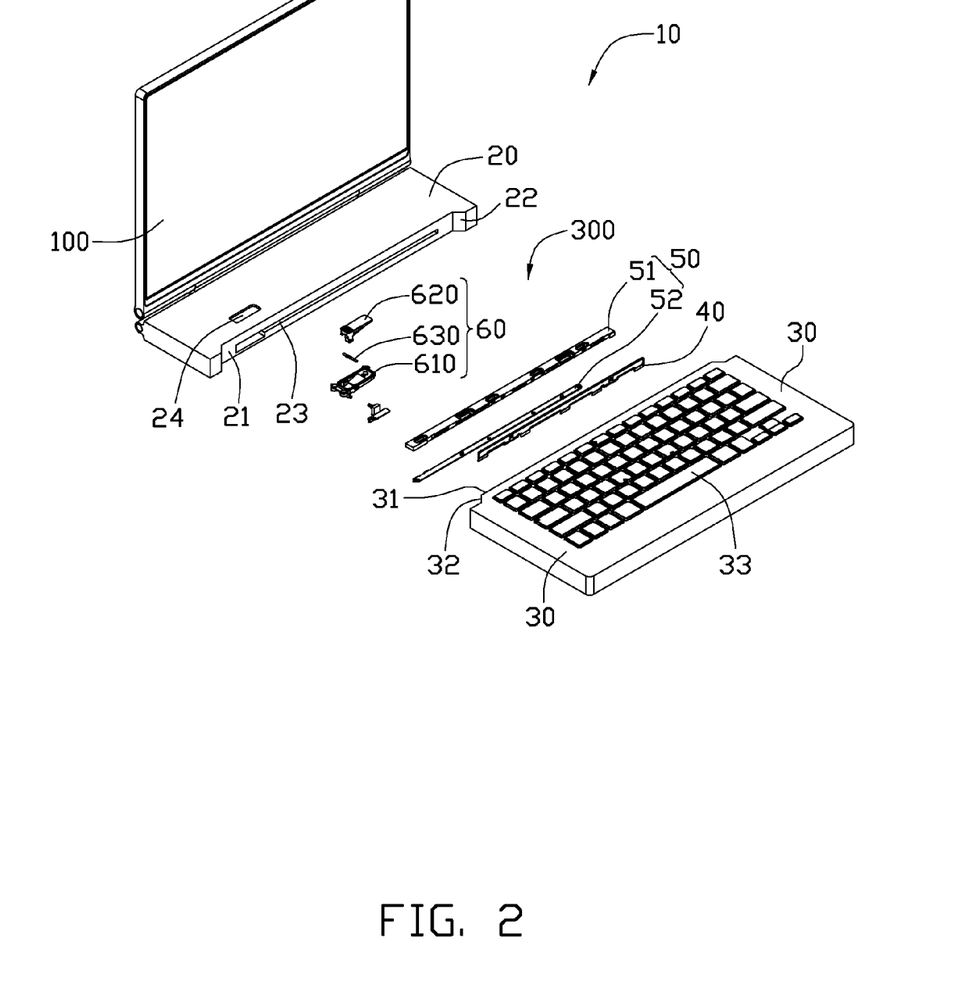
FIG. 2 is an exploded, isometric view of the computing device in FIG. 1.

Referring to FIG. 2, the base 20 includes a front coupling surface 21 and the detachable member 30 includes a back coupling surface 31. The front coupling surface 21 and the back coupling surface 31 are opposite to each other. To facilitate the connection of the detachable member 30 to the base 20, a pair of sloped portions 22 are formed on two sides of the base 20 and a pair of matching sloped portions 32 are formed on two sides of the detachable member 30. During connection of the detachable member 30 to the base 20, the sloped portions 22 engages and guides the sloped portions 32, to assist the alignment of the base 20 to the detachable member 30. In the exemplary embodiment, a keyboard 33 is formed in the detachable member 30.

The base 20 also defines a receiving space 23 formed in the coupling surface 21, and an orifice 24 formed in an upper surface. The receiving space 23 extends along the width of the base 20 and communicates with the orifice 24. The receiving space 23 and the orifice 24 are used to receive the components of a latching mechanism, which will be described in detail later.

The computing device 10 also includes a latching mechanism 300 used to connect the detachable member 30 to the base 20. The latching mechanism 300 includes a first locking member 40, a second locking member 50, and an actuating mechanism 60. The first locking member 40 is securely coupled to the back coupling surface 31 of the detachable member 30.

Figure 3:
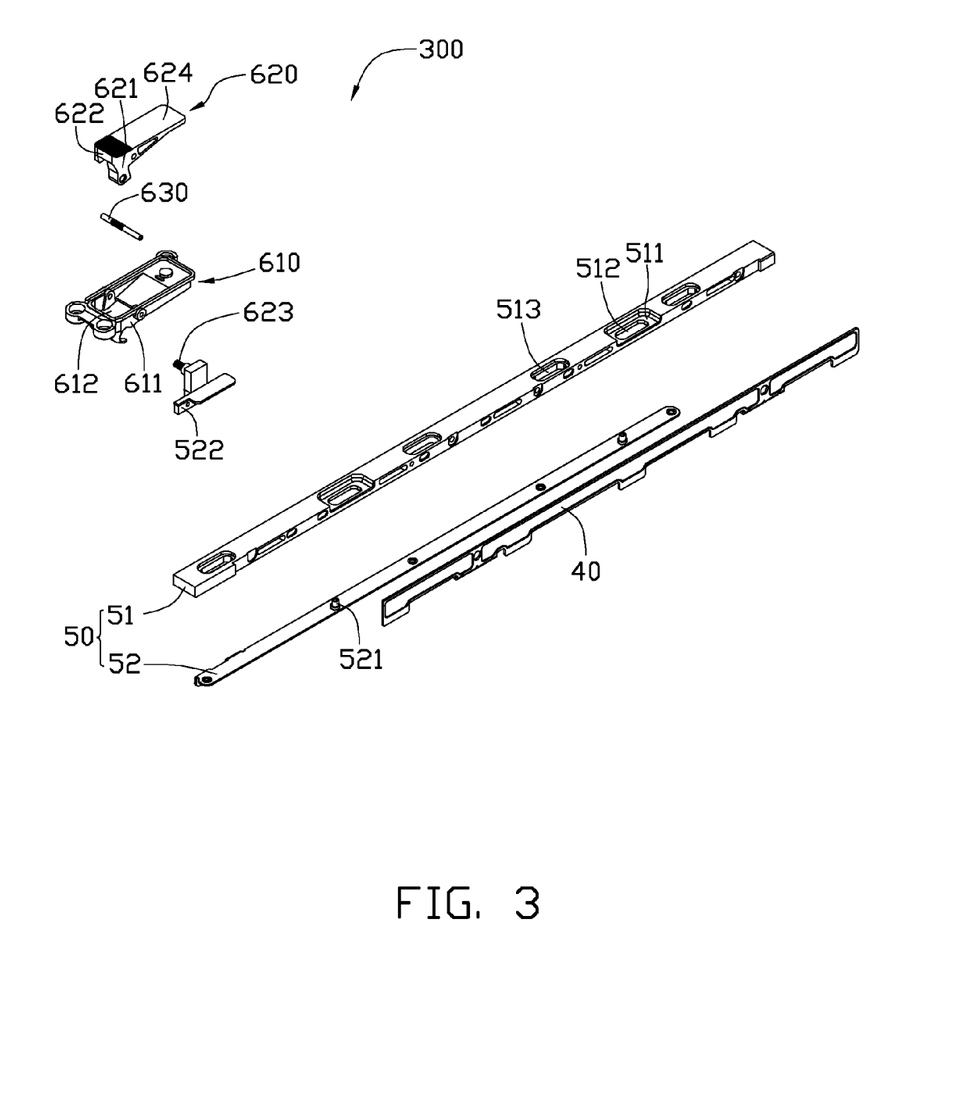
FIG. 3 is an exploded, isometric view of a locking mechanism of the computing device in FIG. 1.
Figure 4:
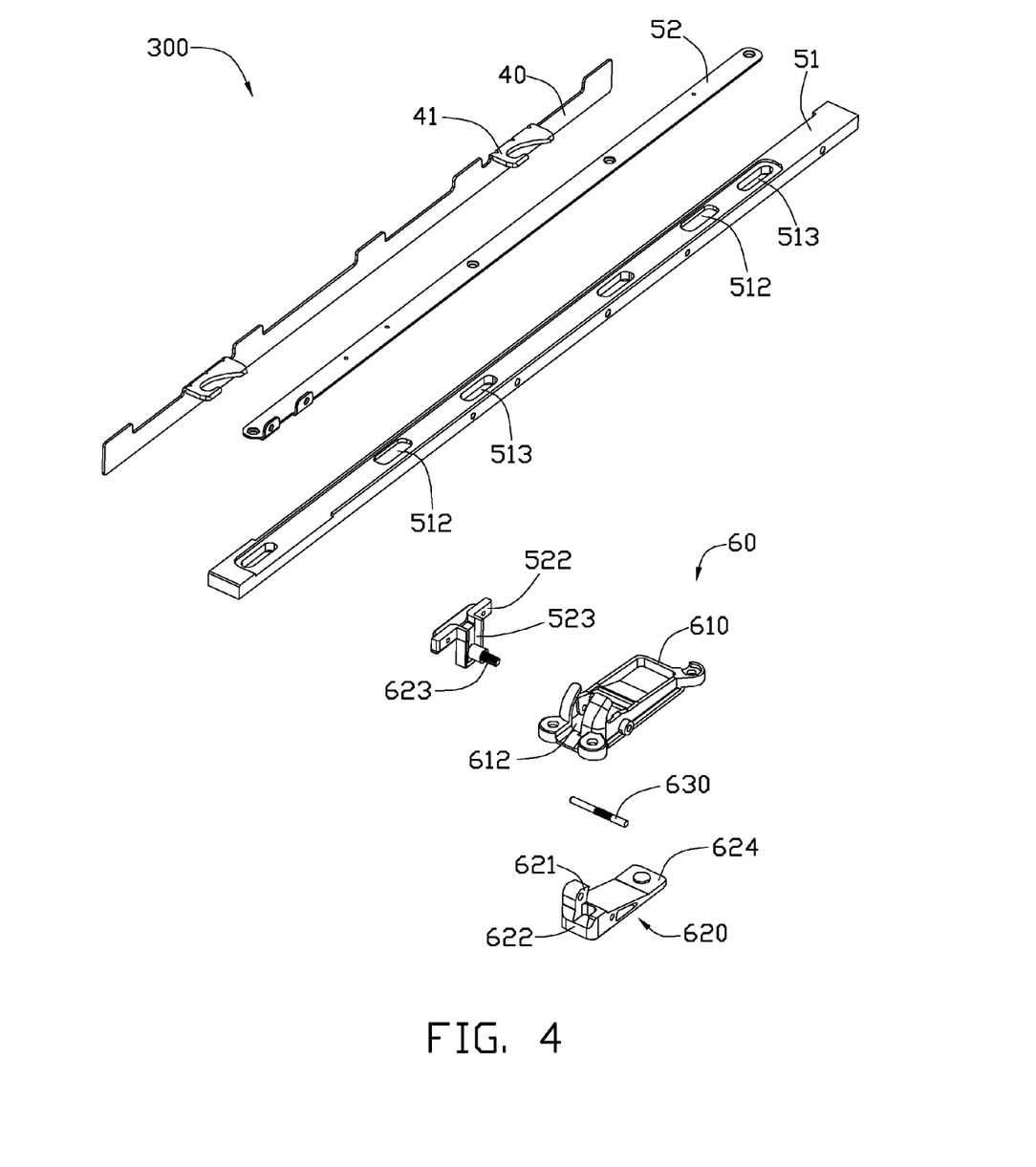
FIG. 4 is another exploded, isometric view of the locking mechanism of the computing device in FIG. 1.
Figure 5:
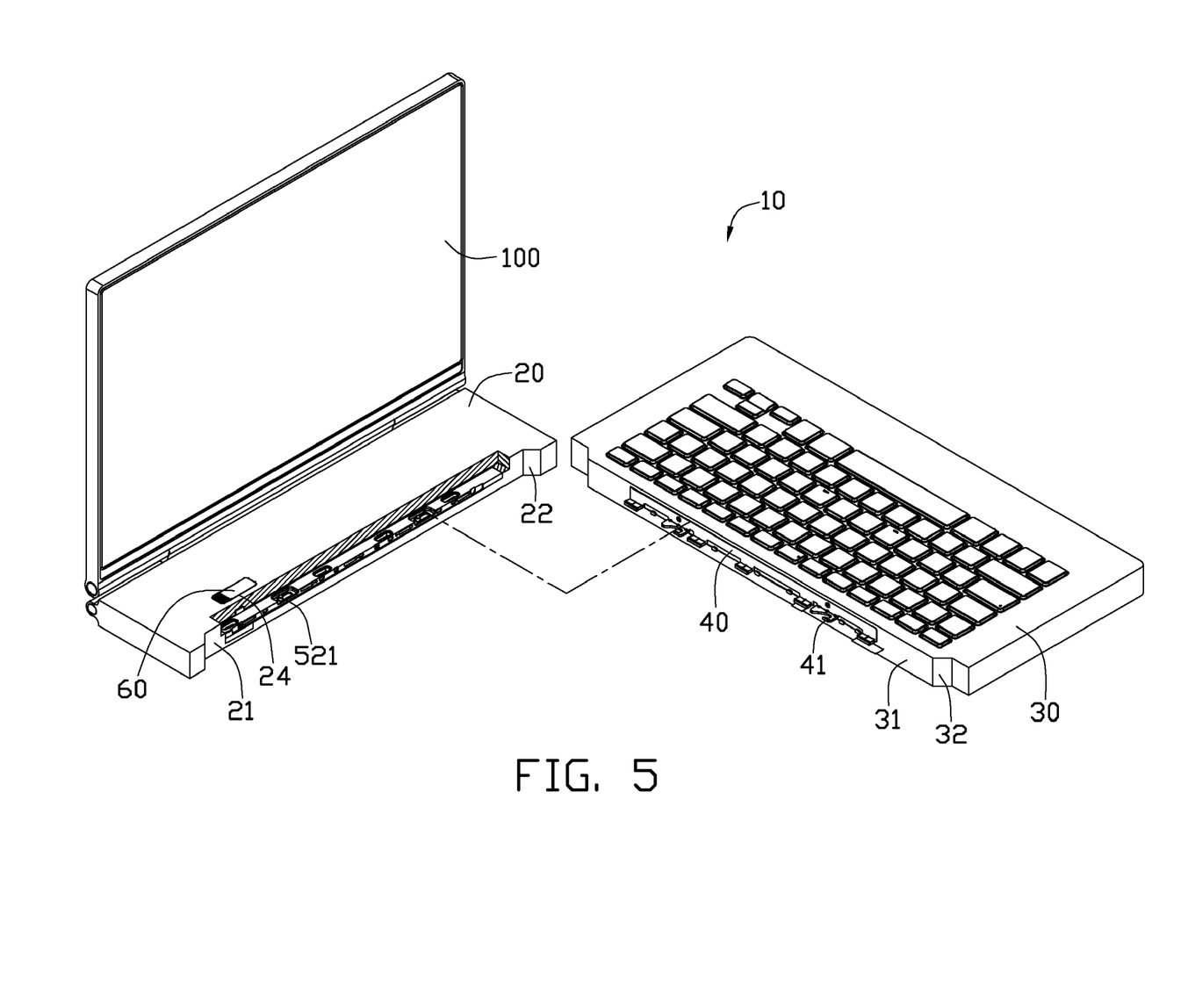
FIG. 5 is an exploded, isometric view showing that the detachable portable computing device in FIG. 1 is in a detachable state.

Referring to FIGS. 3-5, the first locking member 40 is a metal plate and is provided with a pair of hooks 41 protruding from the metal plate. The hooks 41 are substantially perpendicular to the locking member 40 and are spaced from each other. The hooks 41 are substantially perpendicular to the coupling surface 31 of the detachable member 30. The hooks 41 are received in the receiving space 23 in the base 20 and are configured for engaging the second locking member 50, so that the detachable member 30 can be connected to the base 20, which will be described in detail later.

The second locking member 50 includes a base plate 51 and a movable plate 52. The base plate 51 is received in the receiving space 23 and has a length substantially the same as that of the receiving space 23, so the movement of the base plate 51 along the width of the receiving space 23 is limited. Alternatively, the base plate 51 may be securely retained in the receiving space 23 in any suitable conventional connection manner, such as gluing.

The base plate 51 defines a pair of open-ended recessed portions 511 for receiving the hooks 41 of the first locking member 40. Each recessed portion 511 is provided with a slot 512 formed in a bottom surface. The slot 512 is attached with a locking pin on the movable plate 52 and provides sufficient space, so the locking pin can move within the slot 512 to either engage or disengage the hook 41 on the first locking member, which will be described in detail later.

The movable plate 52 is received in the receiving space 23 in the base 20. The movable plate 52 is arranged below and slidably connected to the base plate 51. In the exemplary embodiment, the movable plate 52 is connected to the base plate 51 by screws (not shown). Each screw passes through one groove 513 formed in the base plate 51. The groove 513 extends along the length of the base plate 51 and is used to guide the movable plate 52 to slide with respect to the base plate 51. The movable plate 52 includes a pair of locking pins 521 formed on an upper surface. Each locking pin 521 is received in one slot 512 in the base plate 51.

The movable plate 52 also includes an actuation recipient 522. The actuation recipient 522 defines a sliding groove 523 that extends along the height of the movable plate 52. The actuation recipient 522 is used to engage an actuating paddle of the actuating mechanism 60, which will be described in detail later, such that the movable plate 52 can be actuated by the actuating mechanism 60.

The actuating mechanism 60 includes a frame 610 and an actuating paddle 620. The actuating paddle 620 is rotatably connected to the frame 610 by an axle 630. The frame 610 is secured within the orifice 24 in the base 20 and includes a pair of sidewalls 611. The axle 630 extends between the side walls 611. An opening 612 is defined between the side walls 611.

The actuating paddle 620 includes a protruding arm 621 formed adjacent to an end 622. A post 623 protrudes from a side surface of the protruding arm 621 and extends in a direction substantially parallel to the axle 630. The protruding arm 621 passes through the opening 612 in the frame 610. The post 623 is received in the sliding groove 523 in the actuation receiver 522. The other end 624 of the actuating paddle 620 rests on the frame.

Figure 6:
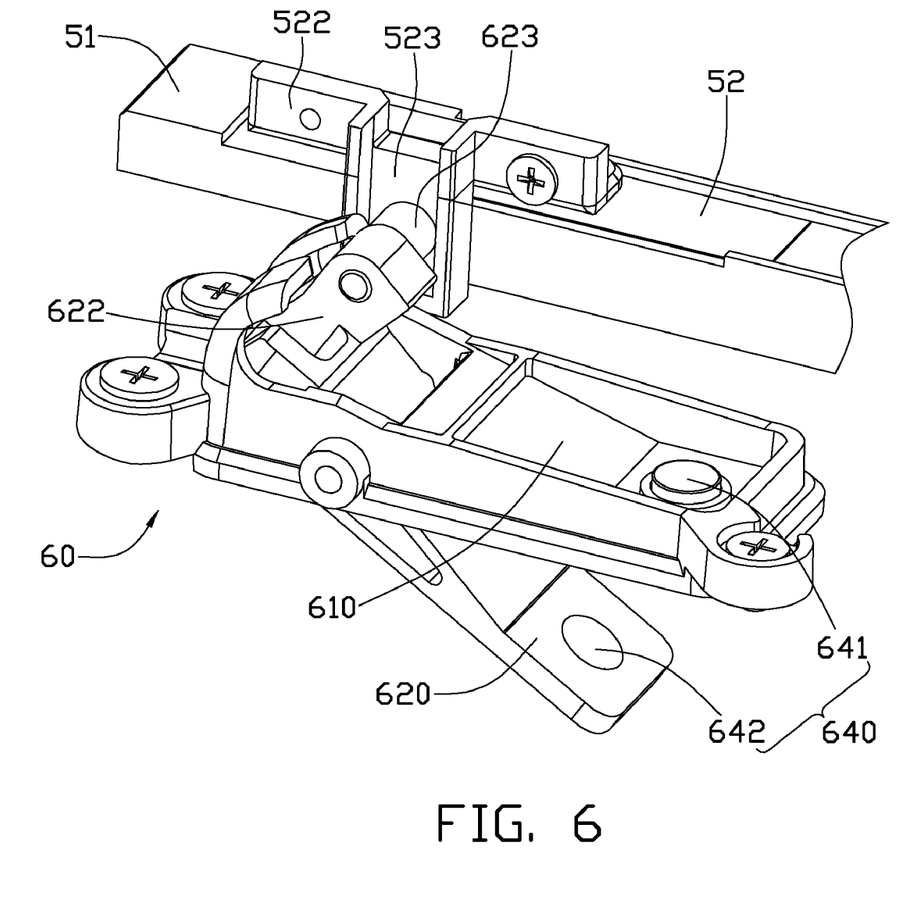
FIG. 6 is a partial view of the computing device in FIG. 1 with certain elements omitted, which shows a relationship between an actuating mechanism and a movable plate.

Referring to FIG. 6, after connection to the frame 610, the top surface of the actuating paddle 620 is substantially flush with the upper surface of the base 20. Upon receiving a push 622 on the paddle 620 from a user, the paddle 620 rotates with respect to the frame 610. As the paddle 620 rotates, the protruding arm 621 moves inwardly, which causes the post 623 to move in the sliding groove 523 in the actuation receiver 522 and applies a push force to the actuation receiver 522. The push force causes the movable plate 52 to slide with respect to the base plate 51.

In the exemplary embodiment, the actuating mechanism 60 also includes a restoring mechanism 640. The restoring mechanism 640 is used to facilitate the actuating paddle 620 to return to its original position after the push from a user has ceased. In the exemplary embodiment, the restoring mechanism 640 includes two magnets 641, 642. The magnets 641, 642 are attached to the frame 610 and the actuating paddle 620, respectively. The magnets 641, 642 have opposite poles. The attractive force between the magnets 641, 642 attracts the actuating paddle 620 to rotate back until the magnets 641, 642 contact each other. As the actuating paddle 620 rotates back, the post 623 engages the sliding groove 523 in the actuation receiver 522, which causes the movable plate 52 to move back to its original position.

It is noteworthy that the restoring mechanism is not limited to the above described. When necessary for example, the restoring mechanism may include a conventional torsion spring.

Figure 7:
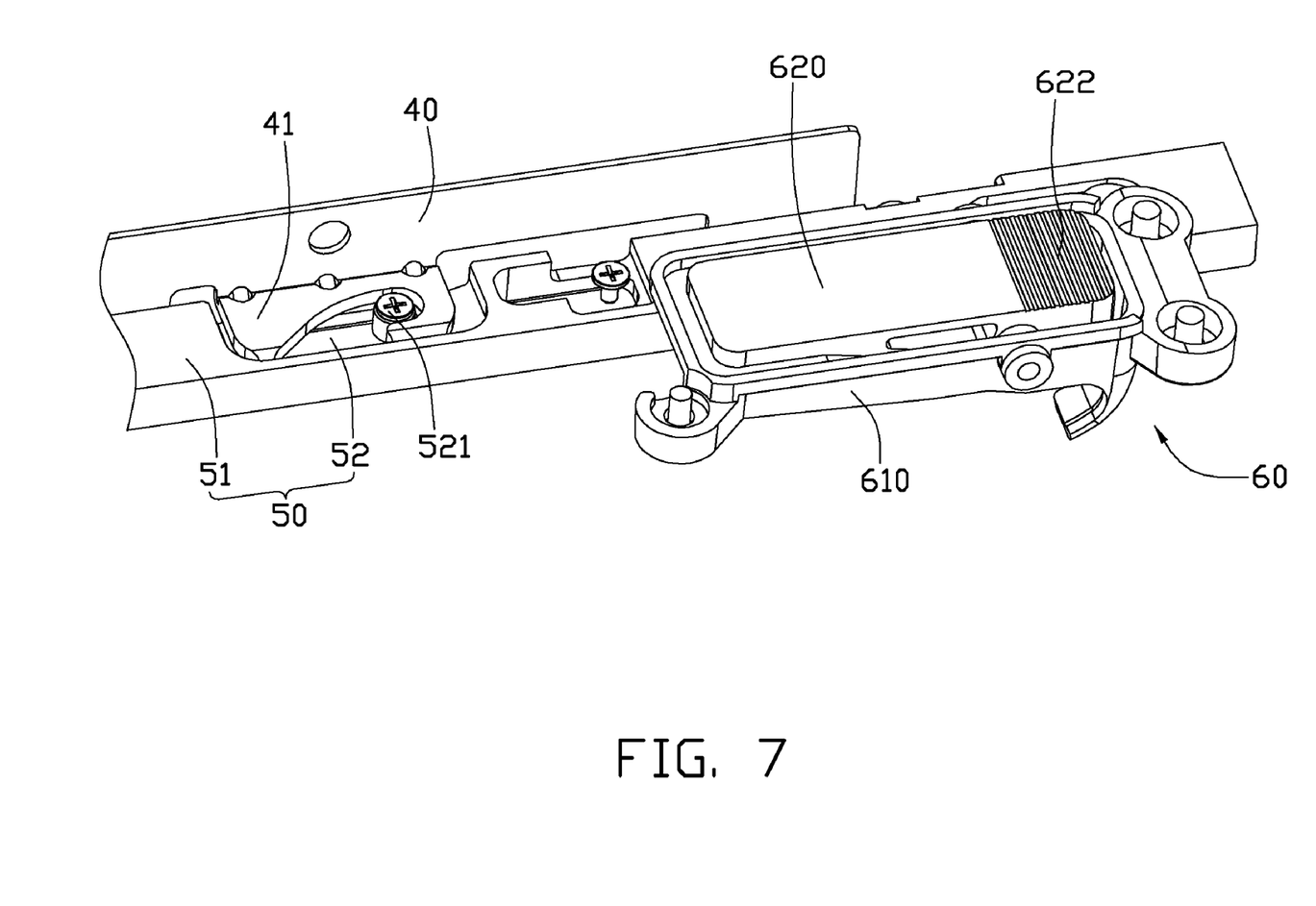
FIG. 7 is a partial view of the computing device in FIG. 1 with certain elements omitted, which shows that a movable plate stays in a first position.
Figure 8:
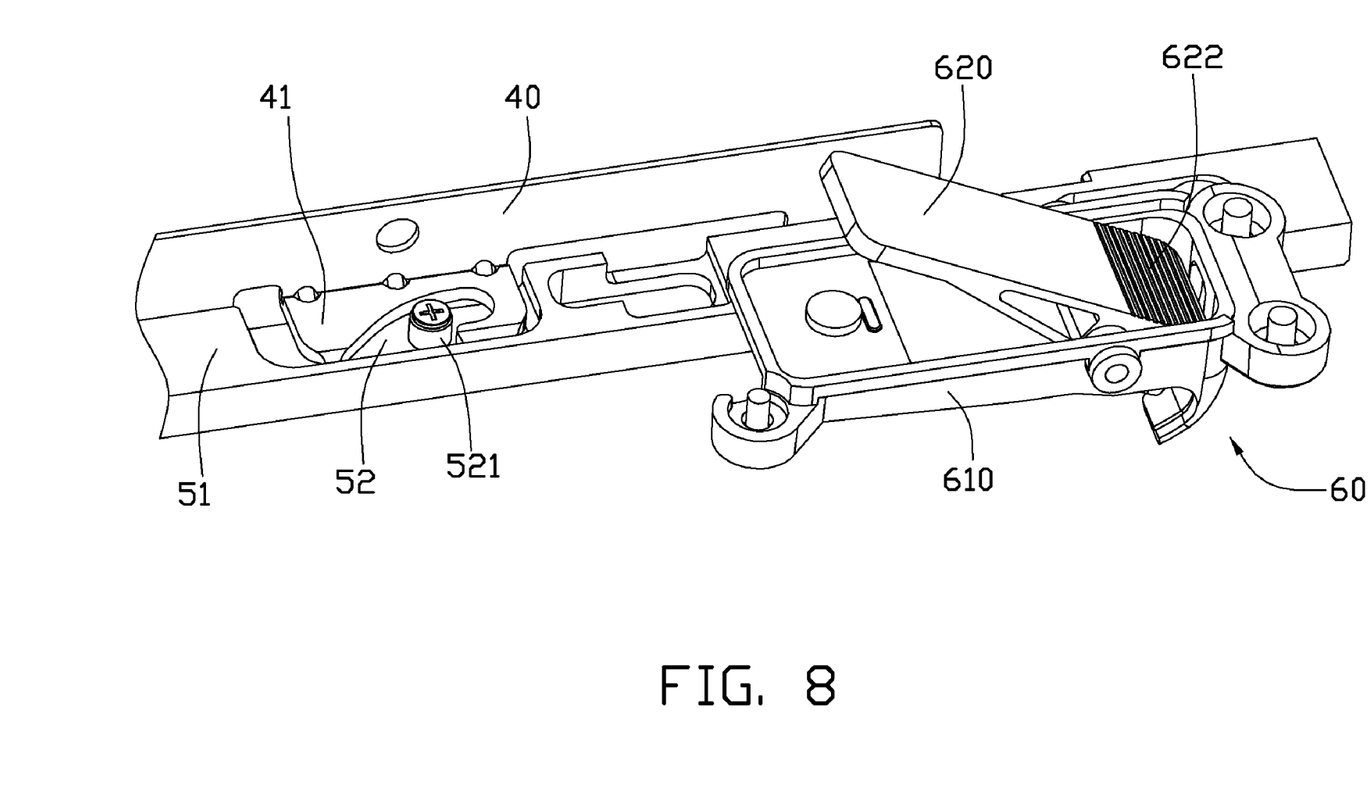
FIG. 8 is a partial view of the computing device in FIG. 1 with certain elements omitted, which shows that the movable plate stays in a second position.

Referring also to FIGS. 7 and 8, the movable plate 52 can be actuated to move between a first position and a second position. In the first position, the hooks 41 on the first locking member 40 engages the locking pins 521 on the movable plate 52 of the second locking member 50, which causes the movable member 30 to connect to the base 20. After the movable plate 52 moves to the second position, the hooks 41 disengages the locking pins 521, which allows the detachable member 30 to detach from the base 20.

While one embodiment has been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A detachable portable computing device comprising:
   a display device; and
   a main body comprising:
   a base rotatably connected to the display device;
   a detachable member detachably connected to the base; and
   a latching mechanism detachably connecting the detachable member to the base, the latching mechanism comprising:
   a first locking member fixedly connected to one of the base and the detachable member;
   a second locking member movably connected to the other one of the base and the detachable member, the second locking member being slidable between a first position and a second position, wherein the detachable member is connected to the base when the second locking member is in the first position, and detached from the base when the second locking member is in the second position; and
   an actuating mechanism attached to the base or the detachable member to actuate the second locking member to move between the first position and the second position.

2. The detachable portable computing device according to claim 1, wherein the base is designed in such a way that the display device is supported on a surface by the base when an angle between the display device and the base keeps in a predetermined range.

3. The detachable portable computing device according to claim 1, wherein the detachable portable computing device is a laptop computer.

4. The detachable portable computing device according to claim 1, wherein the base comprises a first coupling surface opposite to the detachable member, the first coupling surface defines a receiving space extending along a width of the base, the receiving space is configured for receiving the second locking member.

5. The detachable portable computing device according to claim 4, wherein the detachable member comprises a second coupling surface opposite to the first coupling surface, the first locking member is connected to the second coupling surface.

6. The detachable portable computing device according to claim 5, wherein the first locking member comprises at least one locking pin and the second locking member comprises at least one hook, the at least one hook engages the at least one locking pin when the second locking member is in the first position, the at least one hook disengages the at least one locking pin when the second locking member is in the second position.

7. The detachable portable computing device according to claim 1, wherein the second locking member comprises an actuation receiver, the actuating mechanism comprises a frame connected to the base and an actuating paddle pivotably connected to the frame, the actuating paddle is configured for selectively engaging the actuation receiver to enable the second locking member slide between the first position and the second position.

8. The detachable portable computing device according to claim 7, wherein the actuating mechanism further comprises a restoring mechanism configured for returning the actuating paddle to its original position.

9. The detachable portable computing device according to claim 8, wherein the restoring mechanism comprises two magnetic members attached to the actuating paddle and the frame, the two magnetic members are opposite to each other and have opposite poles.

10. The detachable portable computing device according to claim 7, wherein the actuating paddle comprises a post and the actuation receiver defines a groove adapted to receive the post therein, the post and the groove cooperate to convert rotation of the actuating paddle to slide movement of second locking member.

11. The detachable portable computing device according to claim 4, wherein the base comprises a pair of sloped portions at two sides of the receiving space, the detachable member comprises a pair of matching sloped portions which cooperates with the sloped portions to assist alignment of the base and the detachable member during connection of the detachable member to the base.

* * * * *